United States Patent
Rydén et al.

(10) Patent No.: US 11,153,745 B2
(45) Date of Patent: Oct. 19, 2021

(54) METHODS, NETWORK NODE AND WIRELESS DEVICE FOR SUPPORTING POSITIONING OF THE WIRELESS DEVICE

(71) Applicant: Telefonaktiebolaget LM Ericsson (publ), Stockholm (SE)

(72) Inventors: Henrik Rydén, Solna (SE); Fredrik Gunnarsson, Linköping (SE); Sara Modarres Razavi, Linköping (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 162 days.

(21) Appl. No.: 16/344,434

(22) PCT Filed: Feb. 24, 2019

(86) PCT No.: PCT/SE2019/050165
§ 371 (c)(1),
(2) Date: Apr. 24, 2019

(87) PCT Pub. No.: WO2019/168457
PCT Pub. Date: Sep. 6, 2019

(65) Prior Publication Data
US 2020/0120479 A1     Apr. 16, 2020

Related U.S. Application Data

(60) Provisional application No. 62/635,595, filed on Feb. 27, 2018.

(51) Int. Cl.
*H04W 24/10* (2009.01)
*H04W 8/12* (2009.01)
(Continued)

(52) U.S. Cl.
CPC ............. *H04W 8/12* (2013.01); *H04W 24/10* (2013.01); *H04W 64/003* (2013.01); *H04W 84/18* (2013.01)

(58) Field of Classification Search
CPC ....... H04W 4/02–029; H04W 8/08–16; H04W 24/10; H04W 64/00–006
See application file for complete search history.

(56) References Cited

U.S. PATENT DOCUMENTS

| 2010/0109881 A1* | 5/2010 | Eskandarian | ........ | A61B 5/6887 |
| | | | | 340/575 |
| 2014/0278084 A1* | 9/2014 | Lau | .......... | G01S 19/34 |
| | | | | 701/526 |

(Continued)

FOREIGN PATENT DOCUMENTS

| WO | 2014146530 A1 | 9/2014 | |
| WO | WO-2014146530 A1 * | 9/2014 | ............ H04W 64/00 |
| WO | 2018030258 A1 | 2/2018 | |

OTHER PUBLICATIONS

3GPP TS 36.355 V14.0.0 (Dec. 2016) Technical Specification, 3rd Generation Partnership Project; Technical Specification Group Radio Access Network; Evolved Universal Terrestrial Radio Access (E-UTRA); LTE Positioning Protocol (LPP) (Release 14), hereinafter TS36.355 (Year: 2016).*

(Continued)

*Primary Examiner* — Ronald Eisner
(74) *Attorney, Agent, or Firm* — Sage Patent Group (57) ABSTRACT

Methods, network node (200) and wireless device (202) for supporting positioning of the wireless device in a wireless network. The network node requests (2:4) the wireless device to provide a positioning related report when a mobility criterion is fulfilled, which criterion may be selected (2:3) based on sensor capabilities of the device. The wireless device monitors (2:5) sensor measurements and evaluates (Continued)

the mobility criterion. When the mobility criterion is fulfilled the wireless device provides (2:6) the positioning related report to the network node which then obtains (2:7) the position or mobility status of the wireless device based on the positioning related report which may contain information related to said mobility status and/or sensor measurements made in the device.

15 Claims, 5 Drawing Sheets

(51) Int. Cl.
*H04W 64/00* (2009.01)
*H04W 84/18* (2009.01)

(56) References Cited

U.S. PATENT DOCUMENTS

2015/0036517 A1    2/2015  Ruutu et al.
2015/0228136 A1*   8/2015  Chao .................... H04W 12/08
                                                            340/5.61

OTHER PUBLICATIONS

International publication No. WO2014/146530, hereinafter WO2014/146530 (Year: 2014).*
3GPP, "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.4.0, Dec. 2017, 1-168.

* cited by examiner

METHODS, NETWORK NODE AND WIRELESS DEVICE FOR SUPPORTING POSITIONING OF THE WIRELESS DEVICE

TECHNICAL FIELD

The present disclosure relates generally to a network node, a wireless device and methods therein, for supporting positioning of the wireless device in a wireless network.

BACKGROUND

In this disclosure, the term "wireless device" is used to represent any communication entity capable of radio communication with a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device.

Further, the term "network node", is used herein to represent any node of a wireless network that is operative to handle positioning activities as described herein. The network node may be a positioning node or location server which is connected to multiple base stations or radio nodes in the wireless network. The network node in this disclosure may also refer to a radio node in the network that communicates radio signals with wireless devices, and such a radio node may be referred to as a base station, radio node, Node B, eNodeB, base transceiver station, access point, and so forth, depending on the terminology used. In this disclosure, the described network node is not limited to the above examples.

Positioning of a wireless device in a wireless network refers to determination or estimation of the device's current position or location, which is typically performed based on measurements made by the wireless device and/or by one or more radio nodes of the network. Throughout this disclosure, the terms "position" and "location" are synonyms used interchangeably.

Figure 1:
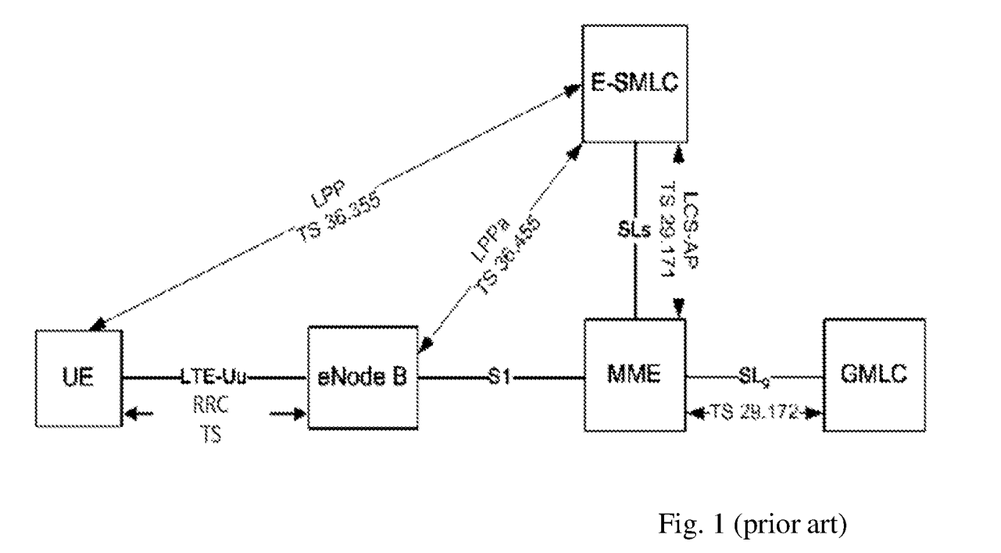
FIG. 1 is an overview illustration of a network architecture with interfaces that can be used for positioning of a UE according in a wireless network that is based on LTE.

Positioning in Long Term Evolution, LTE, is supported by the architecture illustrated in FIG. 1, with direct interactions between a wireless device, here denoted UE, and a location server (E-SMLC) via the LTE Positioning Protocol (LPP). Moreover, there are also interactions between the location server and the eNodeB via the LPPa protocol, to some extent supported by interactions between the eNodeB and the UE via the Radio Resource Control (RRC) protocol. Some interfaces and protocols that can be used for communication between the shown nodes as defined for LTE by the third Generation Partnership Project, 3GPP, are indicated in this figure.

The following positioning techniques are considered in LTE:
  Enhanced Cell ID (ECID). Essentially using cell ID information to associate the UE to a serving area of a serving cell, and then additional information may be used to determine a finer granularity position, i.e. determine the UEs position with higher accuracy.
  GNSS (Assisted Global Navigation Satellite System). GNSS information indicating an "absolute" position, e.g. in terms of coordinates, can sometimes be retrieved by the UE, supported by assistance information provided to the UE from E-SMLC.
  OTDOA (Observed Time Difference of Arrival). The UE estimates the time difference of reference signals from different base stations and sends the resulting OTDOA to the E-SMLC for positioning of the UE by multi-lateration.
  UTDOA (Uplink TDOA). The UE is requested to transmit a specific waveform that is detected by multiple location measurement units (e.g. an eNB) at known positions. These measurements are forwarded to E-SMLC for positioning of the UE by multi-lateration.

Positioning of persons and objects carrying wireless devices is considered as one of the essential use case of cellular technologies. There are various technologies defined in 3GPP to more or less accurately estimate the position of a wireless device. Similarly, use cases involving positioning determination can vary from for being able to determine if someone or something has moved to being able to accurately determine the exact location of movement.

In order to fulfill high positioning accuracy requirements in different deployment conditions, it may be useful to consider hybrid solutions which combines two or more of the above positioning techniques. Some sensor measurements made in the UE, can provide useful information in terms of relative positioning to a reference position that may be provided by some other positioning method. In 3GPP Rel.14, the support for barometric pressure sensor provided a solution for UE's vertical position estimation. The ongoing 3GPP Rel.15 work items include support for sensor measurements made by sensors in wireless devices which may be useful for positioning.

However, positioning techniques that use positioning related information such as mobility status and sensor measurements require that the wireless device generates and reports such information to the network, resulting in added load on the wireless network and its radio resources. To provide such reporting of positioning related information also increases the power consumption in the wireless device and may be too high, especially when it is difficult or even impossible to charge the device's battery frequently enough. A trade-off may thus have to be made between accurate position determination and network load plus power consumption.

SUMMARY

It is an object of embodiments described herein to address at least some of the problems and issues outlined above. It is possible to achieve this object and others by using a network node, a wireless device and methods therein as defined in the attached independent claims.

According to one aspect, a method is performed by a network node e.g. for supporting positioning of a wireless device in a wireless network. In this method, the network node requests or configures the wireless device to provide a positioning related report when a mobility criterion is fulfilled. The network node further receives the requested positioning related report from the wireless device, and obtains the position or mobility status of the wireless device based on the received positioning related report. The positioning related report may contain a mobility status and/or sensor measurements made by the wireless device such as measurements of motion and surroundings.

According to another aspect, a network node is arranged to support positioning of a wireless device in a wireless network. The network node is configured to request or configure the wireless device to provide a positioning related report when a mobility criterion is fulfilled. The network node is also configured to receive the requested positioning related report from the wireless device, and to obtain the position or mobility status of the wireless device based on the received positioning related report.

According to another aspect, a method is performed by a wireless device, e.g. for supporting positioning of the wireless device in a wireless network. In this method, the wireless device obtains a mobility criterion which determines whether to provide a positioning related report to a network node, and monitors sensor measurements to evaluate the obtained mobility criterion. The wireless device further provides the positioning related report to the network node when the mobility criterion is fulfilled.

According to another aspect, a wireless device is arranged to support positioning of the wireless device in a wireless network. The wireless device is configured to obtain a mobility criterion which determines whether to provide a positioning related report to a network node, and to monitor sensor measurements to evaluate the mobility criterion. The wireless device is further configured to provide the positioning related report to the network node when the mobility criterion is fulfilled.

When using one or more of the above methods, network node and wireless device, it is an advantage that the amount of reported information can be limited so as to not cause excessive power consumption and load on the wireless network and its radio resources, and still achieve a useful and efficient basis for accurate positioning of the wireless device. For example, the compilation and reporting of positioning related information from the wireless device to the network will be avoided when the mobility criterion is not fulfilled by the sensor measurements monitored by the wireless device.

The above methods, network node and wireless device may be configured and implemented according to different optional embodiments to ensure the above advantages and/or to accomplish further features and benefits, to be described below.

A computer program is also provided comprising instructions which, when executed on at least one processor in either of the above network node and wireless device, cause the at least one processor to carry out the method described above. A carrier is also provided which contains the above computer program, wherein the carrier is one of an electronic signal, an optical signal, a radio signal, or a computer readable storage medium. It should be noted that the above processor may also be referred to as a processing circuitry which is basically a synonym for processor. Throughout this description, the term processor could thus be substituted by "processing circuitry".

BRIEF DESCRIPTION OF DRAWINGS

The solution will now be described in more detail by means of exemplary embodiments and with reference to the accompanying drawings, in which.

DETAILED DESCRIPTION

In the following description, the term UE is frequently used to denote a wireless device for short. Most of the UEs in the market today are equipped with an Inertial Measurement Unit (IMU). The IMU may contain for example a 3-axis gyroscope and a 3-axis accelerometer. The use of IMU can increase the positioning performance and accuracy, while IMU could also be used to reduce the need for measurements conducted at the device. The measurements made by these sensors can be fused to form an estimate of UE's position. However, a positioning system solely based on IMU is basically a relative positioning system, i.e., it can estimate the position of a UE relative to a known reference position.

IMU, which is also referred to as an Inertial Navigation System (INS), is based on motion sensors such as accelerometers, rotation sensors such as gyroscopes), and occasionally magnetic sensors such as magnetometers. These sensors are able to continuously calculate, e.g. via so-called "dead reckoning", the position, orientation, and velocity including direction and speed of movement, of the UE. This information in combination with a reference point report can help the network to provide further improved positioning accuracy and tracking capabilities for moving UEs.

Other types of sensor information may also be helpful in positioning and previously, barometric pressure sensors have been included in LPP. Other types of sensors of interest include for example light sensors where recent investigations have indicated that UE light sensors can be used to detect whether the UE is located indoors. For example, the UE uses the light sensor/camera to measure the ambient light, which is used to classify whether the UE is located indoors or outdoors. The sensor can for example measure the light intensity, but it can also analyze the spectral properties of the ambient light to identify characteristics of light bulbs, LEDs, fluorescent light, halogen lights or other light sources typically found indoors. An indication whether the UE has moved from outdoor to indoor or vice versa can thus be estimated using light sensors.

In 3GPP Rel. 15 work item in indoor positioning, it was agreed to:
  Specify support for IMU positioning:
    Specify the signalling and procedure to support IMU positioning over LPP and hybrid positioning including IMU related estimates.

UEs operating according to 3GPP Rel.15, referred to as Rel.15 UEs, will therefore report their sensor data, mainly for enabling the relative displacement estimation at the network.

However, the existing solutions for positioning are associated with various problems. When sophisticated IMU sensors are used, this can aid in location estimation with respect to a reference position and a time when a GPS signal is lost. Measurements from IMU sensors can also complement and enhance measurements obtained from other positioning methods such as OTDOA or ECID. Thus, IMU sensors can be used in hybrid positioning methods.

Some wireless devices can estimate their location via GNSS, while other devices have no such localization capabilities, or they could be too battery constrained so that GNSS cannot be activated because it consumes too much energy draining the battery. The support of sensor reporting in Rel-15 only enables a relative estimate, i.e. a position in relation to a reference point. UEs only supporting sensor data will only acquire a location displacement, but no localization in absolute coordinates (in comparison with e.g. GNSS). IMUs in smartphones are considered to belong to the lowest grade of inertial sensors (the commercial grade), and can exhibit significant bias, scale factor, misalignment, and random noise errors. However, there are still use-case available which can benefit from IMU measurement reporting. This can be mainly in respect to the time when then UE has changed its movement behavior.

The 3GPP standard needs to exploit these capabilities of IMU sensors to determine the mobility of the UE, and the report of the location data should be made as efficient as possible. For example, reporting of orientation (degree/sec), magnetometer reading (magnetic intensity) or change accelerometer reading (m/sec square) even when there is no change in displacement, will create an excessive number of measurement reports, while not reporting such measurements during UE movement may on the other hand create a large position estimation error. The current 3GPP standard only supports triggering UE location related reports upon cell change, and a UE triggered report based on cell change causes a large uncertainty in the UE location when the cell size is large, e.g. in rural areas.

The examples and embodiments described below enable a wireless network to configure a location report triggering criterion based upon certain mobility status criterion and implies that the UE will provide a location information report, also referred to herein as a positioning related report, based upon the fulfillment of the criterion. This mobility status criterion will in this description frequently be denoted "mobility criterion" for short, or sometimes alternatively as "mobility status change criteria". Further, the location information report corresponds to the positioning related report described herein.

Figure 2:
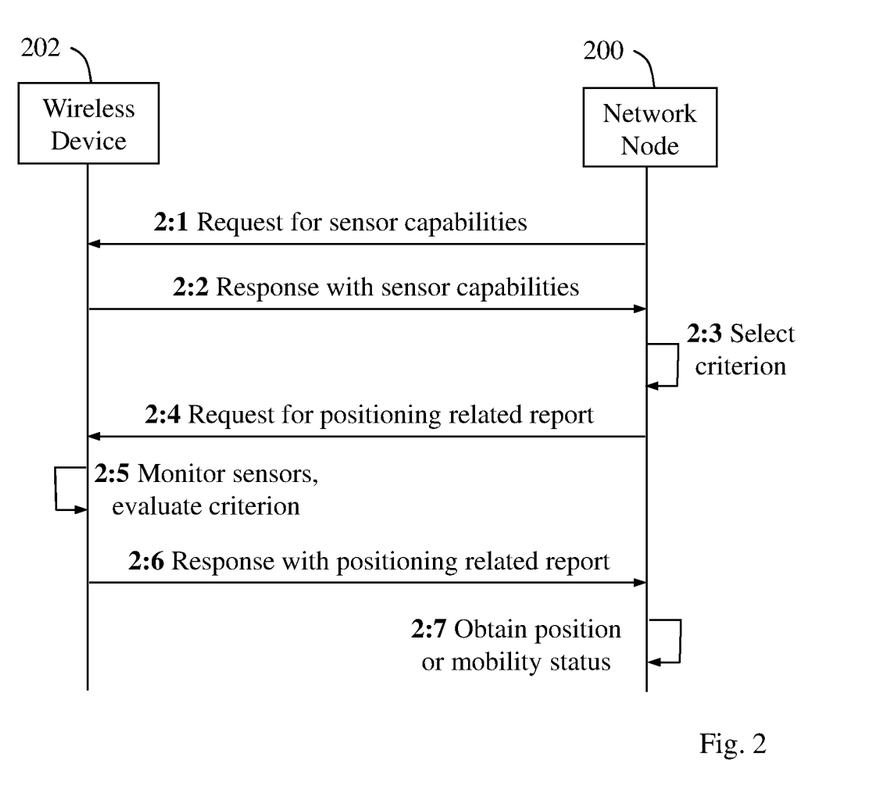
FIG. 2 is a signaling diagram illustrating an example of a procedure when the solution is used, according to some example embodiments.

A communication scenario where at least some of the examples herein are employed is illustrated in FIG. 2 involving a network node 200 of a wireless network and a wireless device 202 served by the network node 200, which may communicate with each other over a wireless communication link. The network node may be a positioning node or location server such as an E-SMLC, without limitation to these examples.

It is assumed that the network node 200 is operative to determine or estimate the wireless device's current position, in other words to perform positioning of a wireless device 202, as follows. As indicated above, the network node 200 may be a location server or the like, or it could also be radio node such as a base station. A first action 2:1 illustrates that the network node 200 sends a request for sensor capabilities to the wireless device 202, so that a mobility criterion that suits the device's capabilities can be selected and employed in the positioning. In a next action 2:2, the wireless device 202 returns its sensor capabilities to the network node 200 in response to the preceding request.

The network node 200 then selects, or configures, a mobility criterion for the device 202 based on the received sensor capabilities in an action 2:3, and sends a request to the wireless device 202 in an action 2:4, to provide a positioning related report when the mobility criterion is fulfilled. This request includes the mobility criterion selected or configured in action 2:3. The request may alternatively include just a reference to the selected mobility criterion which may have been preconfigured in the device 202 in advance.

To meet the request of action 2:4, the wireless device 202 monitors one or more sensors in the device 202 with respect to measurements that are more or less continuously performed by the sensors, and evaluates the received mobility criterion with respect to the monitored sensor measurements, in an action 2:5.

Once the mobility criterion is fulfilled by the monitored sensor measurements, the wireless device 202 compiles location information from the sensor measurements and sends a response to the network node 200 with the required positioning related report, in a further action 2:6. The positioning related report thus contains the location information compiled by the device 202. The network node 200 is thereby able to obtain the position or mobility status of the wireless device 202 based on the information in the received positioning related report, in a final shown action 2:7.

Figure 3:
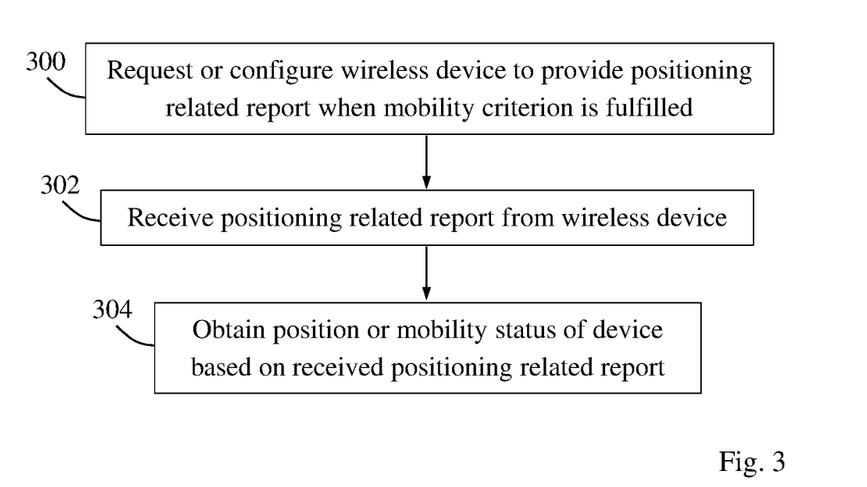
FIG. 3 is a flow chart illustrating a procedure in a network node, according to further example embodiments.

An example of how the solution may be employed in terms of actions performed by a network node such as the network node 200, is illustrated by the flow chart in FIG. 3. This figure will now be described with further reference to FIG. 2 which may serve as an illustrative communication scenario, although the procedure in FIG. 3 is not limited to the example of FIG. 2. FIG. 3 thus illustrates a procedure that could be executed in the network node 200 for supporting positioning of a wireless device in a wireless network, such as the wireless device 202. Some optional example embodiments that could be used in this procedure will also be described.

A first action 300 illustrates that the network node 200 requests or configures the wireless device 202 to provide a positioning related report when a mobility criterion is fulfilled. This action may be implemented by sending a separate explicit request for the report to the device 202 or by configuring the device 202 in advance with the mobility criterion as part of a registration procedure or the like. The mobility criterion may require that the report should be sent when a certain condition related to sensor measurements is fulfilled. Action 300 corresponds to action 2:4 in FIG. 2.

In a next action 302, the network node 200 receives the requested positioning related report from the wireless device 202, which corresponds to action 2:6 in FIG. 2. The received positioning related report contains information about sensor measurements that have been performed in the wireless device 202. By receiving the positioning related report, the network node 200 can deduce that the mobility criterion is fulfilled in the wireless device 202 to trigger the positioning related report. Finally, the network node 200 obtains, e.g. identifies, estimates or calculates, the position or mobility status of the wireless device 202 based on the received positioning related report, in a further action 304. Action 304 corresponds to action 2:7 in FIG. 2.

Some further examples of embodiments that may be employed in the above procedure in FIG. 3 will now be described. In one example embodiment, the mobility criterion may be dependent on the wireless device's mobility behaviour so that the positioning related report is required when the wireless device 202 detects a movement or changed position, which may be detected by motion sensors and possibly also by other sensors in the device. This embodiment thus helps to avoid that a positioning related report is sent by the device 202 in vain when it has not significantly moved since a foregoing report, which implies that the latest obtained position of the device 202 is still deemed to be valid and basically correct. By avoiding unnecessary reports in this way, the load on network resources as well as energy consumption in the device 202 can be saved.

In another example embodiment, the mobility criterion may be selected or defined based on capabilities of one or more sensors in the wireless device 202. It was described above that a mobility criterion was selected in action 2:3 based on the wireless device's 202 sensor capabilities provided in action 2:2.

In another example embodiment, the sensor capabilities may be related to at least one of: sensor accuracy and sampling frequency. The sensor capabilities may be further related to what type of measurements the sensors can do, e.g. measurements related to motion, speed, light, temperature, reception of radio signals, and so forth.

In another example embodiment, the network node 200 may perform said requesting in action 300 by sending the mobility criterion to the wireless device 202. Alternatively, the mobility criterion may have been preconfigured in the wireless device 202, e.g. in a registration procedure or the like. It is also possible that when the wireless device 202 has a preconfigured mobility criterion, the network node 200 could send an updated mobility criterion to the wireless device 202 in action 300 to replace the preconfigured one.

In another example embodiment, the positioning related report received from the device 202 in action 302 may comprise a mobility status of the wireless device and/or measurements performed by the wireless device such as sensor measurements and/or measurements on received signals. Some examples of mobility status will be described later below.

In another example embodiment, the positioning related report received in action 302 may further comprise an estimated position computed by the wireless device 202 itself. It is thus possible that the wireless device is capable of estimating its position based on various measurements such as the measurements in any of the above-mentioned techniques OTDOA and GNSS.

In further example embodiments, the mobility criterion may comprise one or more thresholds that could be related to any of: size of detected movement, variance and/or average of sensor measurements performed over a number of time windows, duration since a previous positioning related report, and the number of previous positioning related reports during a certain time period. For example, the mobility criterion may in these embodiments require that one or more of the above example measurements and parameters fulfil a respective threshold value.

In some further example embodiments, said sensor measurements may be related to any one or more of: orientation, magnetic intensity, acceleration and displacement. In this context, the term magnetic intensity may refer to the strength or intensity of a magnetic field, or to magnetic flux density B which can be measured in Newton-meters per Ampere (Nm/A), also referred to as Teslas (T).

Figure 4:
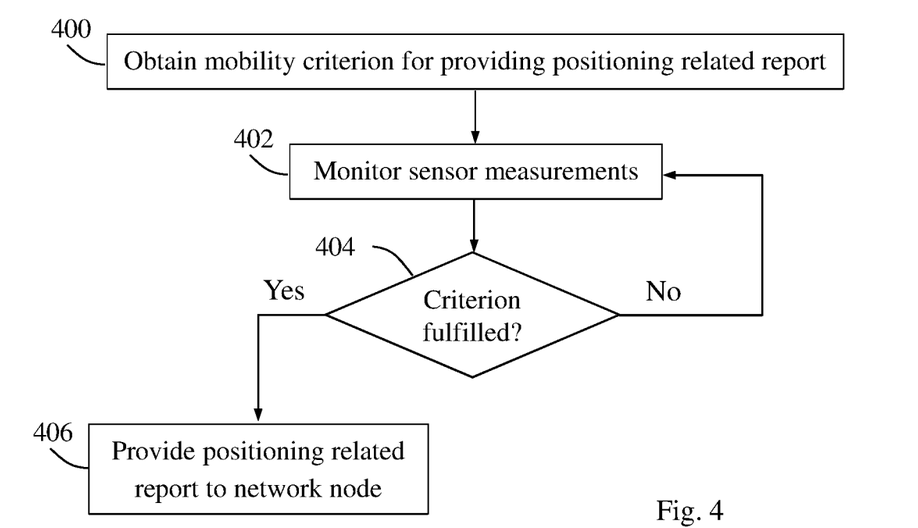
FIG. 4 is a flow chart illustrating a procedure in a wireless device, according to further example embodiments.

Another example of how the solution may be employed in terms of actions performed by a wireless device such as the wireless device 202, is further illustrated by the flow chart in FIG. 4. This figure will now be described likewise with further reference to FIG. 2, although the procedure in FIG. 4 is not limited to the example of FIG. 2. FIG. 4 thus illustrates a procedure that could be executed in the wireless device 202 for supporting positioning of the wireless device in a wireless network. Some optional example embodiments that could be used in this procedure will also be described.

A first action 400 illustrates that the wireless device 202 obtains a mobility criterion which determines whether to provide a positioning related report to a network node 200, which corresponds to the above actions 2:4 and 300. In a next action 402, the wireless device 202 monitors sensor measurements and evaluates the obtained mobility criterion based on the monitored sensor measurements in another action 404. Actions 402 and 404 correspond to action 2:5.

In a final action 406, the wireless device 202 provides the positioning related report to the network node 200 when the mobility criterion is fulfilled. Providing the positioning related report may involve some compilation of measurement results such as calculation of a representative measurement value from several measurements which may have been made over one or more predefined time windows.

Some further examples of embodiments that may be employed in the above procedure in FIG. 4 will now be described. In one example embodiment, the mobility criterion may be dependent on the wireless device's mobility behaviour so that the positioning related report is required when the wireless device detects a movement or changed position.

In another example embodiment, the wireless device 202 may provide capabilities of one or more sensors to the network node 200, as in the above action 2:2, which capabilities can be used by the network node 200 as a basis for selecting the mobility criterion.

In further example embodiments, the sensor capabilities may be related to at least one of: sensor accuracy and sampling frequency.

In another example embodiment, the mobility criterion in action 400 may be received from the network node 200 in a request for providing the positioning related report, as described above for action 2:4.

In further example embodiments, the positioning related report provided in action 406 may comprise a mobility status of the wireless device and/or measurements performed by the wireless device such as sensor measurements and/or measurements on received signals.

In another example embodiment, the positioning related report provided in action 406 may further comprise an estimated position computed by the wireless device, which has also been described above for action 302.

In further example embodiments, the mobility criterion may comprise one or more thresholds related to any one or more of: size of detected movement, variance and/or average of sensor measurements performed over a number of time windows, duration since a previous positioning related report, and the number of previous positioning related reports during a certain time period. As also mentioned above, the mobility criterion may require that one or more of the above example measurements and parameters fulfil a respective threshold value.

In some further example embodiments, said sensor measurements may be related to any one or more of: orientation, magnetic intensity, acceleration and displacement. It was mentioned above that the magnetic intensity indicates the magnetic flux density or the strength or intensity of a magnetic field.

Figure 5:
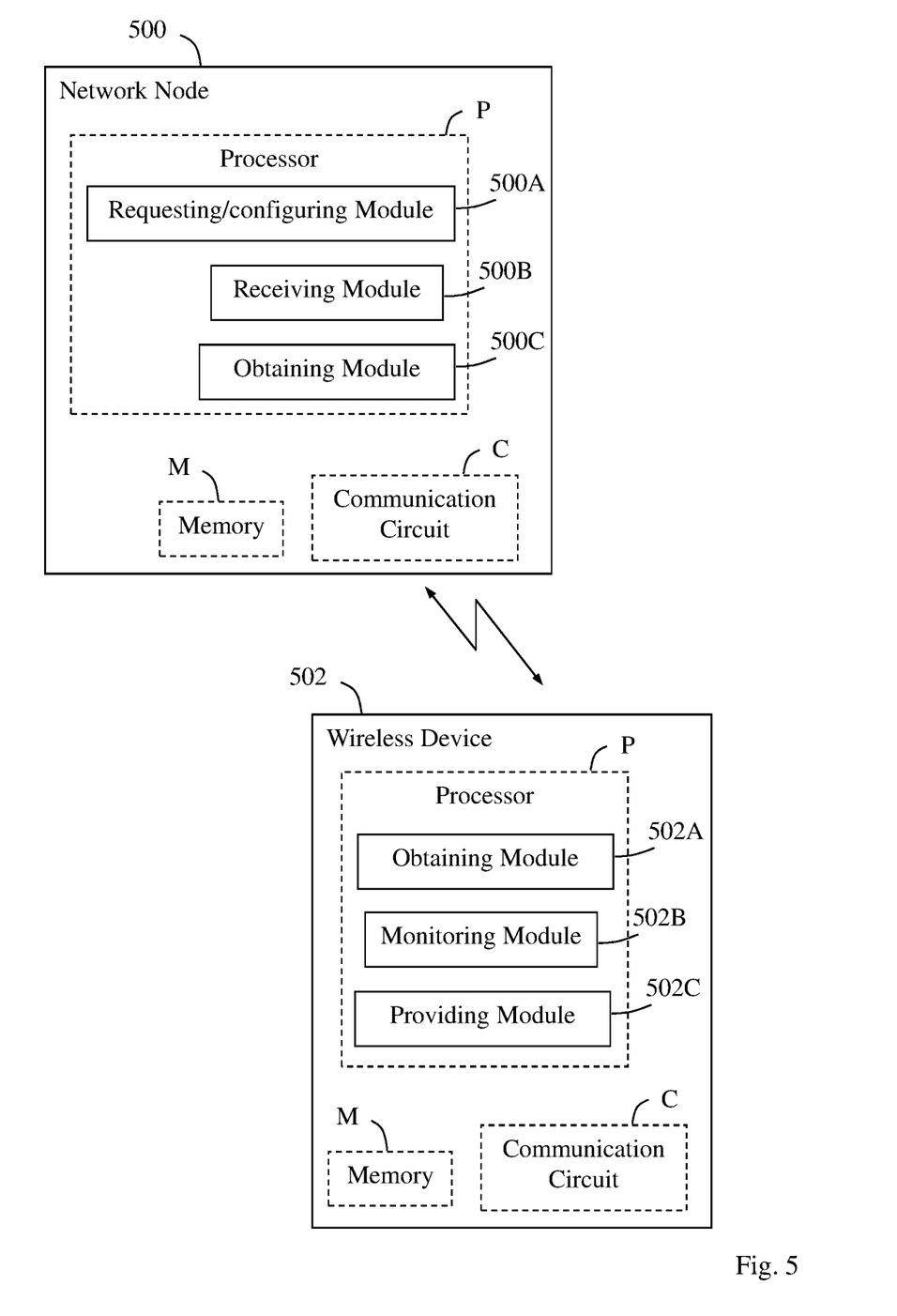
FIG. 5 is a block diagram illustrating how a network node and a wireless device may be structured, according to further example embodiments.

The block diagram in FIG. 5 illustrates a detailed but non-limiting example of how a network node 500 and a wireless device 502, respectively, may be structured to bring about the above-described solution and embodiments thereof. In this figure, the network node 500 and the wireless device 502, or respective processing circuitries therein, may be configured to operate according to any of the examples and embodiments of employing the solution as described herein, where appropriate. Each of the network node 500 and the wireless device 502 is shown to comprise a processor "P", a memory "M" and a communication circuit "C" with suitable equipment for transmitting and receiving messages and information in the manner described herein. As mentioned above, the processor P could also be denoted a processing circuitry.

The communication circuit C in each of the network node 500 and the wireless device 502 thus comprises equipment configured for communication with each other using a suitable protocol for the communication depending on the implementation. The solution is however not limited to any specific types of messages or protocols.

The network node 500 is, e.g. by means of units, modules or the like, configured or arranged to perform at least some of the actions of the flow chart in FIG. 3 and as follows. Further, the wireless device 502 is, e.g. by means of units, modules or the like, configured or arranged to perform at least some of the actions of the flow chart in FIG. 4 and as follows.

The network node 500 is arranged to support positioning of a wireless device 502 in a wireless network. The network node 500 is configured to request or configure the wireless device to provide a positioning related report when a mobility criterion is fulfilled. This operation may be performed by a requesting/configuring module 500A in the network node 500, as illustrated in action 300.

The network node 500 is also configured to receive the requested positioning related report from the wireless device. This operation may be performed by a receiving module 500B in the network node 500, as illustrated in action 302.

The network node 500 is further configured to obtain the position or mobility status of the wireless device based on the received positioning related report. This operation may be performed by an obtaining module 500C in the network node 500, as illustrated in action 304.

The wireless device 502 is arranged to support positioning of the wireless device in a wireless network. The wireless device 502 is configured to obtain a mobility criterion which determines whether to provide a positioning related report to a network node. This operation may be performed by an obtaining module 502A in the wireless device 502, as illustrated in action 400.

The wireless device 502 is also configured to monitor sensor measurements to evaluate the mobility criterion. This operation may be performed by a monitoring module 502B in the wireless device 502, as illustrated in action 402. The monitoring module 502A could alternatively be named an evaluating module.

The wireless device 502 is further configured to provide the positioning related report to the network node when the mobility criterion is fulfilled. This operation may be performed by a providing module 502C in the wireless device 502, as illustrated in action 406. The providing module 502C could alternatively be named a sending module.

With respect to the above-mentioned modules, the network node 500 may be described as comprising the requesting or configuring module 500A which is configured to request or configure the wireless device to provide a positioning related report when a mobility criterion is fulfilled. The network node 500 further comprises the receiving module 500B which is configured to receive the requested positioning related report from the wireless device, and the obtaining module 500C which is configured to obtain the position or mobility status of the wireless device based on the received positioning related report.

In a similar manner, the wireless device 502 may be described as comprising the obtaining module 502A which is configured to obtain a mobility criterion which determines whether to provide a positioning related report to a network node 500. The wireless device 502 further comprises the monitoring module 502B which is configured to monitor sensor measurements to evaluate the mobility criterion, and the providing module 502C which is configured to provide the positioning related report to the network node when the mobility criterion is fulfilled.

It should be noted that FIG. 5 illustrates various functional modules in the network node 500 and the wireless device 502, respectively, and the skilled person is able to implement these functional modules in practice using suitable software and hardware equipment. Thus, the solution is generally not limited to the shown structures of the network node 500 and the wireless device 502, and the functional modules therein may be configured to operate according to any of the features, examples and embodiments described in this disclosure, where appropriate.

The functional modules 500A-C and 502A-C described above may be implemented in the network node 500 and the wireless device 502, respectively, by means of program modules of a respective computer program comprising code means which, when run by the processor P causes the network node 500 and the wireless device 502 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 500 and the wireless device 502 in the form of a memory having a computer readable medium and being connected to the processor P. The computer program product or memory M in each of the network node 500 and the wireless device 502 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 500 and wireless device 502.

The solution described herein may be implemented in each of the network node 500 and the wireless device 502 by a computer program comprising instructions which, when executed on at least one processor, cause the at least one processor to carry out the actions according to any of the above embodiments and examples, where appropriate. The solution may also be implemented at each of the network node 500 and the wireless device 502 in a carrier containing the above computer program, wherein the carrier is one of an electronic signal, optical signal, radio signal, or computer readable storage medium.

Some further examples and features will now be described.

Figure 6:
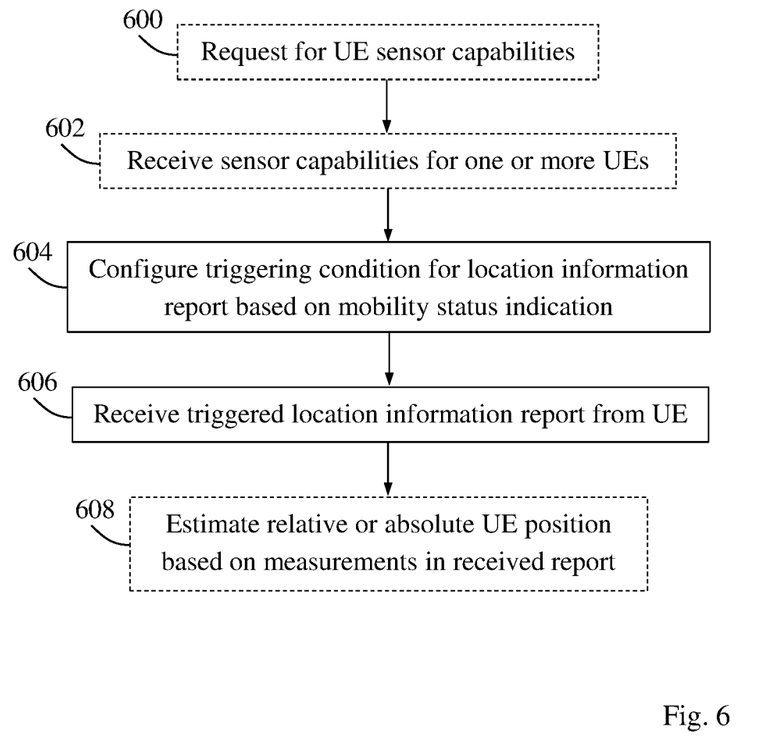
FIG. 6 is a flow chart illustrating an example of how a network node may operate in more detail, according to further possible embodiments.

A procedure from a network node perspective is shown in FIG. 6 comprising steps performed by a network node such as the above-described network node 200 and/or 500. In a first step 600, the network node (typically a location server) may optionally request to receive the UE's sensor capability which can be as simple as providing the network with movement behavior change. In a next optional step 602, the network node may receive a capability request response back from the UE, containing information about the UE's sensor capability. In a further step 604, the network node configures one or more location information report triggering condition based on a mobility status indication. In another step 606, the network node receives a location information report from the wireless device as triggered by said triggering condition. In a final step 608, the network node estimates or computes a relative or absolute position of the UE based on the sensor measurement(s) contained in the received location information report, possibly in combination with other positioning methods such as OTODA.

Figure 7:
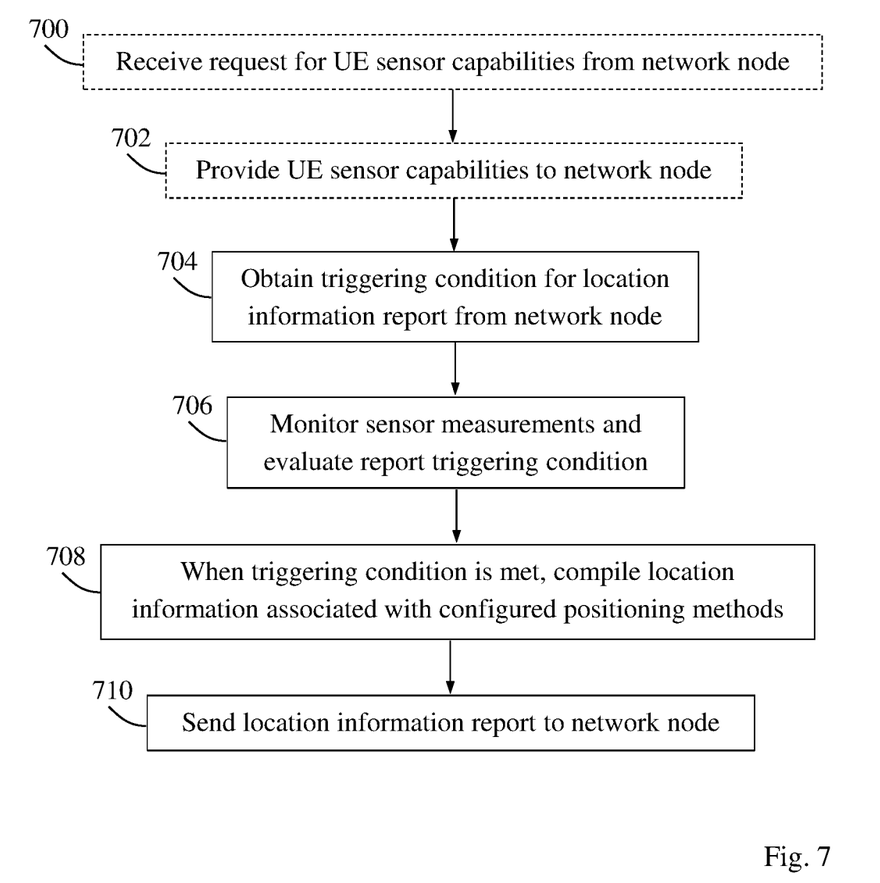
FIG. 7 is a flow chart illustrating an example of how a wireless device may operate in more detail, according to further possible embodiments.

A procedure from a target device perspective is shown in FIG. 7 comprising steps performed by the target device, which may be performed in conjunction with the above-described steps by the network node in FIG. 6 as indicated below. The term "target device" is often used in this field to denote a wireless device to be positioned. The target device in this example corresponds to the above-described wireless device 202 and/or 502. In a first step 700, the target device may optionally receive a request on sensor capability from the network node, which corresponds to the above step 600. That sensor capability may include parts associated to location information report triggering based on mobility status indications.

In a next optional step 702, the target device optionally provides the network node with its sensor capabilities, which corresponds to the above step 602. In another step 704, the target device receives from the network node a triggering condition for issuing a location information report, where the triggering condition is based on a mobility status indication, which corresponds to the above step 604.

In another step 706, the target device monitors sensor measurements and evaluates the report triggering criterion based on the monitored sensor measurements, e.g. repeatedly or regularly, for example to meet certain triggering delays. If the triggering condition is met in another step 708, the device will compile location information and generate a location information report comprising said location information associated to configured positioning methods.

The triggered location information report with the compiled location information is finally sent to the network node in a step 710, which corresponds to the above step 606. Thereby, the network node is able to use the received location information report as a basis for determining the position of the target device as described for the above step 608.

In an alternative embodiment, the device may, upon triggering the condition, instead of step 708 and 710 be configured to log the location information upon triggering the condition. The compiled log of location information can be sent in bulk to the network node either when the log is considered to be completed due to log size or logging time, or when receiving a request from the network node.

Some advantages that may be obtained when using the examples herein are as follows.

IMU Sensor measurements can be integrated for reporting location measurements. The sensors have the ability to detect mobility which can aid in positioning estimation. Inclusion of sensor triggered reports as a basis for the positioning provides more efficient positioning since the reports are transmitted when the device is moving (changing location) but not when remaining in the same location. Various thresholds can be configured by the network to achieve a suitable trade-off between frequent position estimation and reporting overhead. Using the configured thresholds, the device can check if its measurements meet the criteria and thus trigger the location reporting. Similarly, the UE can also check the variance in measurement during a time duration and in the case of large variance can trigger the location reporting.

There are some use cases mainly involved in tracking of assets which requires movement detection and estimation of relative displacement. For instance, to track assets stored in an inventory when moved from one section of store to another section of the store. In such cases, instead of periodically use expensive GPS or computationally heavy OTDOA methods, IMU sensors can be used to trigger the GPS or OTDOA methods. Also, it could be used to trigger a simple IMU sensors-based positioning method.

Some examples of how the above-mentioned sensor measurements could be made and used, will now be described in more detail.

The IMU sensors, as described above, can be used for finding the orientation, velocity estimation, and so-called Pedestrian Dead Reckoning, PDR. IMU sensors are capable of providing raw measurements at a high sampling rate.

Given the above, the following definitions can be made:
Raw IMU measurements—measurements obtained directly from the IMU in a UE-bound coordinate system, which can have a sampling rate of several 100 Hz.
Processed IMU measurements—any processing of the raw IMU measurements to filter, down-sample, and extract statistical properties of the raw measurements, still in relation to a UE coordinate system.
Transformed IMU measurements—any processing of the raw IMU measurements to fuse and align with an earth-bounded coordinate system.

The same categorization could be used also for other types of sensors, such as a barometric sensor, light sensor, humidity sensor, etc.

In a general sense, a sensor measurement for sensor i at a certain time t is denoted $y^i_t$. From this measurement, it is possible to determine statistical properties over several sensor measurements over a time window T, such as all times from the set $S_r$: $\{\tau$ such that $t-T \leq \tau \leq t\}$ Typical relevant statistical properties include the average and the variance (or standard deviation), but other statistical properties can be considered as well.

For example, the average value of the N most recent values can be determined as:

$$m^i_{t,T} = \frac{1}{N} \sum_{\tau=t-N+1}^{t} y^i_\tau$$

And the variance (unbiased estimate) can be determined as:

$$v^i_{t,T} = \frac{1}{N-1} \sum_{\tau=t-N+1}^{t} (y^i_\tau - m^i_{t,T})$$

A trigger condition in the above-described mobility criterion can be formulated based on a specific statistical property of a sensor measurement, or based on the relative difference between two consecutive instances of the specific statistical property of a sensor measurement.

Examples

Average value greater than a threshold
$m^i_{t,T} >$ Threshold

Can be enhanced with a time to trigger, meaning that the triggering condition has to be met for consecutive instances of the average over a configured time window Can also be extended with a leaving condition $m_{t,T}^i$>Threshold+hysteresis either to halt periodic reporting initiated with the triggering condition, or just to signal that the triggering condition is simply not met any longer Variance value greater than a threshold, may be similar to above for average Relative average greater than a threshold $m_{t,T}^i\ m_{t-T,T}^i \geq$ Threshold Can be enhanced with a time to trigger, where the long term average is compared to the recent values.

$m_{t,T}^i - m_{t-T0,T0}^i \geq$ Threshold, where T0 is larger than T, and in addition, the criterion needs to be fulfilled for consecutive t's.

Can be extended with a leaving condition with a hysteresis as above.

Some examples of how the above-mentioned mobility status could be determined and used, will now be described in more detail.

As described above, the UE may have certain sensors which can provide information that indicates whether the UE has changed its mobility status or not. The change in mobility status may for example comprise:

Changing from steady mode to moving mode, and opposite (i.e. vice versa).

Changing from very low speed mode to very high steady mode, and opposite (vice versa).

Changing in direction with a certain (e.g. 90, 180, . . . ) degree of direction difference.

There may further be certain criteria, either defined by the network node or otherwise known at the UE, to define each mobility status change. Such criteria correspond to the above-mentioned mobility criterion which will henceforth be referred to as the "mobility status change criteria" below.

The UE may thus have sensors that sense or "read" various conditions that are somehow indicative of a change of position, basically depending on whether the mobility status change criteria is/are fulfilled or not. For example, the mobility status change criteria can be based upon one or more of the following criteria related to various thresholds:

variance in orientation≥orientation threshold variance in magnetic intensity≥magnetic intensity threshold variance in acceleration≥acceleration threshold variance in displacement≥displacement threshold average orientation≥average orientation threshold average acceleration≥average acceleration threshold average displacement≥average displacement threshold The above sensor readings may be measured during a certain time window T. The time window may be signalled to the wireless device from the network node, e.g. a location server. Further, the time window could be defined as a UTC time duration, or a certain number of LTE subframes, or a certain number of sensor samples. In another embodiment, the criteria should be fulfilled for more than N time windows.

In case of UE reporting its sensor capabilities (as in actions 2:2 and 702), the mobility status change criteria can be based on the received capabilities. The sensor capabilities can for example include the accuracy of each sensor, and the network tunes for example the variance thresholds based on the received capabilities. The capabilities could also include the sampling frequency of each sensor, this can be used to select the time window T.

In one example, it may be said that once the mobility status change criteria is met, the UE can report location based upon any positioning methods such as A-GNSS, OTDOA or ECID. The positioning report may further be appended with IMU results such as measurements of displacement and acceleration.

In another example, once mobility status change criteria is met, UE can report location based upon solely IMU results such as measurements of displacement and acceleration.

It will now be outlined how the above features could be supported in signaling schemes.

In one possibility, it may be said that a new trigger for location reporting has been defined as below from 3GPP 36.355 (based on v14.4.0). In the following extracts from 3GPP 36.355 (based on v14.4.0), parts that are useful for implementing at least some of the embodiments herein are underlined.

CommonIEsRequestLocationInformation

The CommonIEsRequestLocationInformation carries common IEs for a Request Location Information LPP message Type.

```
-- ASN1START
CommonIEsRequestLocationInformation ::= SEQUENCE {
    locationInformationType    LocationInformationType,
    triggeredReporting         TriggeredReportingCriteria      OPTIONAL,    -- Cond ECID
    periodicalReporting        PeriodicalReportingCriteria     OPTIONAL,    -- Need ON
    additionalInformation      AdditionalInformation           OPTIONAL,    -- Need ON
    qos                        Qos                             OPTIONAL,    -- Need ON
    environment                Environment                     OPTIONAL,    -- Need ON
    locationCoordinateTypes    LocationCoordinateTypes         OPTIONAL,    -- Need ON
    velocityTypes              VelocityTypes                   OPTIONAL,    -- Need ON
    ...,
    [[
        messageSizeLimitNB-r14  MessageSizeLimitNB-r14         OPTIONAL     -- Need ON
    ]]
}
    LocationInformationType ::= ENUMERATED {
    locationEstimateRequired,
    locationMeasurementsRequired,
    locationEstimatePreferred,
    locationMeasurementsPreferred,
    ...
}
    PeriodicalReportingCriteria ::=    SEQUENCE {
        reportingAmount                ENUMERATED {
                                       ra1, ra2, ra4, ra8, ra16, ra32,
```

-continued

```
                                                    ra64, ra-Infinity
                                                } DEFAULT ra-Infinity,
        reportingInterval                       ENUMERATED {
                                                    noPeriodicalReporting, ri0-25,
                                                    ri0-5, ri1, ri2, ri4, ri8, ri16, ri32, ri64
                                                }
}
TriggeredReportingCriteria ::=              SEQUENCE {
    cellChange                                  BOOLEAN,
    reportingDuration                           ReportingDuration,
    ...,
    [[
        mobilityStatusChange                    BOOLEAN
    ]]
}
ReportingDuration ::=                       INTEGER (0..255)
AdditionalInformation ::= ENUMERATED {
    onlyReturnInformationRequested,
    mayReturnAditionalInformation,
    ...
}
Qos ::= SEQUENCE {
    horizontalAccuracy        HorizontalAccuracy        OPTIONAL,       -- Need ON
    verticalCoordinateRequest BOOLEAN,
    verticalAccuracy          VerticalAccuracy          OPTIONAL,       -- Need ON
    responseTime              ResponseTime              OPTIONAL,       -- Need ON
    velocityRequest           BOOLEAN,
    ...,
    [[ responseTimeNB-r14     ResponseTimeNB-r14        OPTIONAL        -- Need ON
    ]]
}
HorizontalAccuracy ::= SEQUENCE {
    accuracy      INTEGER(0..127),
    confidence    INTEGER(0..100),
    ...
}
VerticalAccuracy ::= SEQUENCE {
    accuracy      INTEGER(0..127),
    confidence    INTEGER(0..100),
    ...
}
ResponseTime ::= SEQUENCE {
    time                               INTEGER (1..128),
    ...,
    [[ responseTimeEarlyFix-r12        INTEGER (1..128)        OPTIONAL       -- Need ON
    ]]
}
ResponseTimeNB-r14 ::= SEQUENCE {
    timeNB-r14                         INTEGER (1..512),
    responseTimeEarlyFixNB-r14         INTEGER (1..512)        OPTIONAL,      -- Need ON
    ...
}
Environment ::= ENUMERATED {
    badArea,
    notBadArea,
    mixedArea,
    ...
}
MessageSizeLimitNB-r14 ::= SEQUENCE {
    measurementLimit-r14               INTEGER (1..512)        OPTIONAL,      -- Need ON
    ...
}
-- ASN1STOP
```

| Conditional presence | Explanation |
| --- | --- |
| ECID | The field is optionally present, need ON, if ECID is requested. Otherwise it is not present. |

CommonIEsRequestLocationInformation field descriptions locationInformationType
This IE indicates whether the server requires a location estimate or measurements. For 'locationEstimateRequired'.
the target device shall return a location estimate if possible, or indicate a location error if not possible. For -continued 'locationMeasurementsRequired', the target device shall return measurements if possible, or indicate a location error if not possible. For 'locationEstimatePreferred', the target device shall return a location estimate if possible, but may also or instead return measurements for any requested position methods for which a location estimate is not possible. For 'locationMeasurementsPreferred', the target device shall return location measurements if possible, but may also or instead return a location estimate for any requested position methods for which return of location measurements is not possible.
triggeredReporting
This IE indicates that triggered reporting is requested and comprises the following subfields:
    cellChange: If this field is set to TRUE, the target device provides requested location information each time the primary call has changed.
    reportingDuration: Maximum duration of triggered reporting in seconds. A value of zero is interpreted to mean an unlimited (i.e. "infinite") duration. The target device should continue triggered reporting for the reportingDuration or until an LPP Abort or LPP Error message is received.
    mobilityStatusChange: If the field is set to TRUE, the target device provides requested location information when a mobilityStatusChangeCriterion of any of the configured positioning methods has been triggered.
The triggeredReporting and mobilityStatusChange fields should not be included by the location server and shall be ignored by the target device if the periodicalReporting IE or responseTime IE or responseTimeNB IE is included in CommonIEsRequestLocationInformation
periodicalReporting
This IE indicates that periodic reporting is requested and comprises the following subfields:
    reportingAmount indicates the number of periodic location information reports requested. Enumerated values correspond to 1, 2, 4, 8, 16, 32, 64, or infinite/indefinite number of reports. If the reportingAmount is 'infinite/indefinite', the target device shou-ld continue periodic reporting until an LPP Abort message is received. The value 'ra1' shall not be used by a sender.
    reportingInterval indicates the interval between location information reports and the response time requirement for the first location information report. Enumerated values ri0-25, ri0-5, ri1, ri2, ri4, ri8, ri16, ri32,
ri64 correspond to reporting intervals of 1, 2, 4, 8, 10, 16, 20, 32, and 64 seconds, respectively. Measurement reports containing no measurements or no location estimate are required when a reportingInterval expires before a target device is able to obtain new measurements or obtain a new location estimate. The value 'noPeriodicalReporting' shall not be used by a sender.

The details with specific triggering conditions per positioning method will be included in separate parts in the specific RequestLocationInformation information elements. For example for sensors with a common MobilityStatusChangeCriterion. An alternative would be specific criterion for each sensor type.

Sensor-RequestLocationInformation

The IE Sensor-RequestLocationInformation is used by the location server to request location information for sensor-based methods from a target device.

```
-- ASN1START
Sensor-RequestLocationInformation-r13 ::= SEQUENCE {
    uncompensationBarometricPressureReq-r13      BOOLEAN,
    ...,
    [[  assistanceAvailability-r14         BOOLEAN      OPTIONAL
    -- Need ON
    ]],
    [[  mobilityStatusChangeCriteria-r15
        MobilityStatusChangeCriteria-r15         OPTIONAL    -- Need ON
    ]]
}
MobilityStatusChangeCriteria-r15::= SEQUENCE (SIZE(1..maxCrit-r15)) OF
MobilityStatusChangeCriterion-r15
MobilityStatusChangeCriterion-r15 ::= SEQUENCE {
    sensorType -r15                ENUMERATE[acc-tot, acc-minus-gray-tot, gyro,
magnetometer, barometer, light, ...},
    statisticalProperty-r15            ENUMERATE(average, variance),
    triggeringType-r15             ENUMERATE(absolute, relative),
    hysteresis-r15                 TBD
    threshold-r15                  TBD
    evaluationWindow-r15           TBD
}
-- ASN1STOP
```

Sensor-RequestLocationInformation field descriptions uncompensatedBarometricPressureReq
This field indicates whether the target device is requested to report Barometric pressure measurements in Sensor-MeasurementInformation IE or not. TRUE means requested.
assistanceAvailability
This field indicates whether the target device may request additional Sensor assistance data from the server. TRUE means allowed and FALSE means not allowed.
mobilityStatusChangeCriteria
The field defines mobility status change criteria the target device shall consider if location information report triggering is requested based on mobility status change, and if there is at least on criterion defined for the sensor positioning method. Otherwise, it is not present The corresponding mobility status change criterion can also be defined for the other positioning methods, for example GNSS:

A-GNSS-RequestLocationInformation

The IE A-GNSS-RequestLocationInformation is used by the location server to request location information from the target device using GNSS.

```
-- ASN1START
A-GNSS-RequestLocationInformation ::= SEQUENCE {
    gnss-PositioningInstructions    GNSS-PositioningInstructions,
    ...,
    [[mobilityStatusChangeCriteria-r15
            MobilityStatusChangeCriteria-r15    OPTIONAL    -- Need ON
    ]]
}
MobilityStatusChangeCriteria-r15::= SEQUENCE (SIZE(1..maxCrit-r15)) OF
MobilityStatusChangeCriterion-r15
MobilityStatusChangeCriterion-r15 ::= SEQUENCE {
    triggeringType-r15              ENUMERATE(relative),
    hysteresis-r15                  TBD
    threshold-r15                   TBD
    evaluationWindow-r15            TBD
}
-- ASN1STOP
```

Where the device can be configured to trigger a location information report if the device has moved sufficiently much based on the GNSS positioning estimates.

While the solution has been described with reference to specific exemplifying embodiments, the description is generally only intended to illustrate the inventive concept and should not be taken as limiting the scope of the solution. For example, the terms "network node", "wireless device", "positioning related report", "mobility criterion", "sensor capabilities" and "sensor measurements" have been used throughout this disclosure, although any other corresponding entities, functions, and/or parameters could also be used having the features and characteristics described here. The solution may be implemented according to the appended claims.

Some numbered example embodiments of the solution will now be outlined as further suggestions of how apparatuses may be configured to implement the above-described network node and wireless device, respectively.

Embodiment 1

A network node (500) arranged to support positioning of a wireless device (202) in a wireless network, the network node (500) comprising processing circuitry configured to:
request or configure (500A) the wireless device to provide a positioning related report when a mobility criterion is fulfilled,
receive (500B) the requested positioning related report from the wireless device, and
obtain (500C) the position or mobility status of the wireless device based on the received positioning related report.

Embodiment 2

A network node (500) according to embodiment 1, wherein the mobility criterion is dependent on the wireless device's mobility behaviour so that the positioning related report is required when the wireless device detects a movement or changed position.

Embodiment 3

A network node (500) according to embodiment 1 or 2, wherein the processing circuitry in the network node (500) is configured to select or define the mobility criterion based on capabilities of one or more sensors in the wireless device.

Embodiment 4

A network node (500) according to embodiment 3, wherein the sensor capabilities are related to at least one of: sensor accuracy and sampling frequency.

Embodiment 5

A network node (500) according to any of embodiments 1-4, wherein the processing circuitry in the network node (500) is configured to request or configure the wireless device to provide the positioning related report, by sending the mobility criterion to the wireless device.

Embodiment 6

A network node (500) according to any of embodiments 1-5, wherein the positioning related report comprises a mobility status of the wireless device and/or measurements performed by the wireless device such as sensor measurements and/or measurements on received signals.

Embodiment 7

A network node (500) according to any of embodiments 1-6, wherein the positioning related report comprises an estimated position computed by the wireless device.

Embodiment 8

A network node (500) according to any of embodiment 1-7, wherein the mobility criterion comprises one or more thresholds related to any of: size of detected movement, variance and/or average of sensor measurements performed over a number of time windows, duration since a previous positioning related report, and the number of previous positioning related reports during a certain time period.

Embodiment 9

A network node (500) according to embodiment 8, wherein said sensor measurements are related to any of: orientation, magnetic intensity, acceleration and displacement.

Embodiment 10

A wireless device (502) arranged to supporting positioning of the wireless device in a wireless network, the wireless device (502) comprising processing circuitry configured to:
- obtain (502A) a mobility criterion which determines whether to provide a positioning related report to a network node,
- monitor (502B) sensor measurements to evaluate the mobility criterion, and
- provide (502C) the positioning related report to the network node when the mobility criterion is fulfilled.

Embodiment 11

A wireless device (502) according to embodiment 10, wherein the mobility criterion is dependent on the wireless device's mobility behaviour so that the positioning related report is required when the wireless device detects a movement or changed position.

Embodiment 12

A wireless device (502) according to embodiment 10 or 11, wherein the processing circuitry in the wireless device (502) is configured to provide capabilities of one or more sensors in the wireless device to the network node.

Embodiment 13

A wireless device (502) according to embodiment 12, wherein the sensor capabilities are related to at least one of: sensor accuracy and sampling frequency.

Embodiment 14

A wireless device (502) according to any of embodiments 10-13, wherein the processing circuitry in the wireless device (502) is configured to receive the mobility criterion from the network node in a request for providing the positioning related report.

Embodiment 15

A wireless device (502) according to any of embodiments 10-14, wherein the positioning related report comprises a mobility status of the wireless device and/or measurements performed by the wireless device such as sensor measurements and/or measurements on received signals.

Embodiment 16

A wireless device (502) according to any of embodiments 10-15, wherein the positioning related report comprises an estimated position computed by the wireless device.

Embodiment 17

A wireless device (502) according to any of embodiments 10-16, wherein the mobility criterion comprises one or more thresholds related to any of: size of detected movement, variance and/or average of sensor measurements performed over a number of time windows, duration since a previous positioning related report, and the number of previous positioning related reports during a certain time period.

Embodiment 18

A wireless device (502) according to embodiment 17, wherein said sensor measurements are related to any of: orientation, magnetic intensity, acceleration and displacement.

Embodiment 19

A network node (500) arranged to support positioning of a wireless device (202) in a wireless network, the network node (500) comprising:
- a requesting or configuring module (500A) configured to request or configure the wireless device to provide a positioning related report when a mobility criterion is fulfilled,
- a receiving module (500B) configured to receive the requested positioning related report from the wireless device, and
- an obtaining module (500C) configured to obtain the position or mobility status of the wireless device based on the received positioning related report.

Embodiment 20

A network node (500) according to embodiment 19, wherein the mobility criterion is dependent on the wireless device's mobility behaviour so that the positioning related report is required when the wireless device detects a movement or changed position.

Embodiment 21

A network node (500) according to embodiment 19 or 20, wherein the network node (500) is configured to select or define the mobility criterion based on capabilities of one or more sensors in the wireless device.

Embodiment 22

A network node (500) according to embodiment 21, wherein the sensor capabilities are related to at least one of: sensor accuracy and sampling frequency.

Embodiment 23

A network node (500) according to any of embodiments 19-22, wherein the network node (500) is configured to request or configure the wireless device to provide the positioning related report, by sending the mobility criterion to the wireless device.

Embodiment 24

A network node (500) according to any of embodiments 19-23, wherein the positioning related report comprises a mobility status of the wireless device and/or measurements performed by the wireless device such as sensor measurements and/or measurements on received signals.

Embodiment 25

A network node (500) according to any of embodiments 19-24, wherein the positioning related report comprises an estimated position computed by the wireless device.

Embodiment 26

A network node (500) according to any of embodiment 19-25, wherein the mobility criterion comprises one or more thresholds related to any of: size of detected movement, variance and/or average of sensor measurements performed over a number of time windows, duration since a previous positioning related report, and the number of previous positioning related reports during a certain time period.

Embodiment 27

A network node (500) according to embodiment 26, wherein said sensor measurements are related to any of: orientation, magnetic intensity, acceleration and displacement.

Embodiment 28

A wireless device (502) arranged to supporting positioning of the wireless device in a wireless network, the wireless device (502) comprising:
- an obtaining module (502A) configured to obtain a mobility criterion which determines whether to provide a positioning related report to a network node,
- a monitoring module (502B) configured to monitor sensor measurements to evaluate the mobility criterion, and
- a providing module (502C) configured to provide the positioning related report to the network node when the mobility criterion is fulfilled.

Embodiment 29

A wireless device (502) according to embodiment 28, wherein the mobility criterion is dependent on the wireless device's mobility behaviour so that the positioning related report is required when the wireless device detects a movement or changed position.

Embodiment 30

A wireless device (502) according to embodiment 28 or 29, wherein the wireless device (502) is configured to provide capabilities of one or more sensors in the wireless device to the network node.

Embodiment 31

A wireless device (502) according to embodiment 30, wherein the sensor capabilities are related to at least one of: sensor accuracy and sampling frequency.

Embodiment 32

A wireless device (502) according to any of embodiments 28-31, wherein the wireless device (502) is configured to receive the mobility criterion from the network node in a request for providing the positioning related report.

Embodiment 33

A wireless device (502) according to any of embodiments 28-32, wherein the positioning related report comprises a mobility status of the wireless device and/or measurements performed by the wireless device such as sensor measurements and/or measurements on received signals.

Embodiment 34

A wireless device (502) according to any of embodiments 28-33, wherein the positioning related report comprises an estimated position computed by the wireless device.

Embodiment 35

A wireless device (502) according to any of embodiments 28-34, wherein the mobility criterion comprises one or more thresholds related to any of: size of detected movement, variance and/or average of sensor measurements performed over a number of time windows, duration since a previous positioning related report, and the number of previous positioning related reports during a certain time period.

Embodiment 36

A wireless device (502) according to embodiment 35, wherein said sensor measurements are related to any of: orientation, magnetic intensity, acceleration and displacement.

The invention claimed is:
1. A method performed by a wireless device in a wireless network, the method comprising:
   - sending sensor capabilities to a network node in response to receiving a request for sensor capabilities of the wireless device;
   - receiving a mobility criterion selected by the network node based on the sensor capabilities of the wireless device, the criterion comprising one or more thresholds;
   - receiving a request from the network node to provide a positioning related report upon the selected mobility criterion being fulfilled;
   - comparing one or more sensor measurements performed by the one or more sensors of the wireless device, against the one or more thresholds;

determining, based on the comparison, whether the mobility criterion has been fulfilled; and providing the positioning-related report to the network node upon the mobility criterion being fulfilled.

2. The method according to claim 1, wherein the mobility criterion is dependent on a mobility behaviour of the wireless device so that the positioning-related report is required when the wireless device detects a movement or changed position.

3. The method according to claim 1, wherein the capabilities are related to sampling frequency.

4. The method according to claim 1, wherein the positioning-related report comprises a mobility status of the wireless device and/or measurements performed by the wireless device.

5. The method according to claim 1, wherein the positioning-related report comprises an estimated position computed by the wireless device.

6. The method according to claim 1, wherein the mobility criterion comprises one or more thresholds related to any of: size of detected movement, variance and/or average of sensor measurements performed over a number of time windows, duration since a previous positioning-related report, and the number of previous positioning-related reports during a certain time period.

7. The method according to claim 6, wherein said sensor measurements are related to any of: orientation, magnetic intensity, acceleration and displacement.

8. A wireless device arranged to supporting positioning of the wireless device in a wireless network, wherein the wireless device comprises processing circuitry configured to:

send sensor capabilities to a network node, in response to receiving a request for sensor capabilities of the wireless device;

receive a mobility criterion selected by the network node based on the sensor capabilities of the wireless device, the criterion comprising one or more thresholds;

receive a request from the network node to provide a positioning related report upon the selected mobility criterion being fulfilled;

compare one or more sensor measurements performed by the one or more sensors of the wireless device, against the one or more thresholds;

determine, based on the comparison, whether the mobility criterion has been fulfilled; and provide the positioning-related report to the network node upon the mobility criterion being fulfilled.

9. The wireless device according to claim 8, wherein the mobility criterion is dependent on a mobility behaviour of the wireless device so that the positioning-related report is required when the wireless device detects a movement or changed position.

10. The wireless device according to claim 8, wherein the sensor capabilities are related to at least one of: sensor accuracy and sampling frequency.

11. The wireless device according to claim 8, wherein the positioning-related report comprises a mobility status of the wireless device and/or measurements performed by the wireless device.

12. The wireless device according to claim 8, wherein the positioning-related report comprises an estimated position computed by the wireless device.

13. The wireless device according to claim 8, wherein the mobility criterion comprises one or more thresholds related to any of: size of detected movement, variance and/or average of sensor measurements performed over a number of time windows, duration since a previous positioning-related report, and the number of previous positioning-related reports during a certain time period.

14. The wireless device according to claim 13, wherein said sensor measurements are related to any of: orientation, magnetic intensity, acceleration and displacement.

15. The method according to claim 1, wherein the capabilities are related to sensor accuracy.

* * * * *